(12) United States Patent
You

(10) Patent No.: US 8,522,340 B2
(45) Date of Patent: Aug. 27, 2013

(54) DEVICE AND METHOD FOR AUTHORIZATION MANAGEMENT

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 99 days.

(21) Appl. No.: 13/244,651

(22) Filed: Sep. 25, 2011

(65) Prior Publication Data

US 2012/0266237 A1    Oct. 18, 2012

(30) Foreign Application Priority Data

Apr. 15, 2011 (CN) .......................... 2011 1 0094820

(51) Int. Cl.
*G06F 21/00*    (2013.01)
(52) U.S. Cl.
USPC .......................................................... 726/19

(58) Field of Classification Search
USPC ............................................................ 726/19
See application file for complete search history.

(56) References Cited

U.S. PATENT DOCUMENTS 5,559,961 A * 9/1996 Blonder ........................... 726/18
2011/0080260 A1* 4/2011 Wang et al. .................. 340/5.83

* cited by examiner

*Primary Examiner* — Jason Gee
(74) *Attorney, Agent, or Firm* — Altis Law Group, Inc.

(57) ABSTRACT

A device may be authorized via a method, which includes: displaying several numbered folder objects while the device is in an unauthorized state, each of which is displayed with a corresponding serial number and represents a folder containing several files stored in the device; executing a predefined operation toward one of the folder objects; detecting the serial numbers corresponding to the operated folder object; comparing the detected serial numbers and a predetermined password; and maintaining the device in the unauthorized state, if the detected serial numbers do not correspond to the password.

7 Claims, 6 Drawing Sheets

DEVICE AND METHOD FOR AUTHORIZATION MANAGEMENT

BACKGROUND

1. Technical Field

The present disclosure relates to electronic devices and a method applied thereto, more particularly relating to a portable electronic device with an authorization managing function and a method for managing authorization.

2. Description of Related Art

As mobile phones with a camera are prevalent today, people usually have numerous images stored in their mobile phones. However, invasions of privacy are becoming commonplace, and there is a high risk of personal private photos being seen by anyone having access to the mobile phone, which may cause distress and undesired consequences. Once the user of the phone has set a password under a traditional security system to try and protect those pictures, another problem is that other people may observe and use that password. Accordingly, a more secure way of protecting those photos is required.

BRIEF DESCRIPTION OF THE DRAWINGS

The components of the drawings are not necessarily drawn to scale, the emphasis instead being placed upon clearly illustrating the principles of the embodiments of the device. Moreover, in the drawings, like reference numerals designate corresponding parts throughout several views.

DETAILED DESCRIPTION

Figure 1:
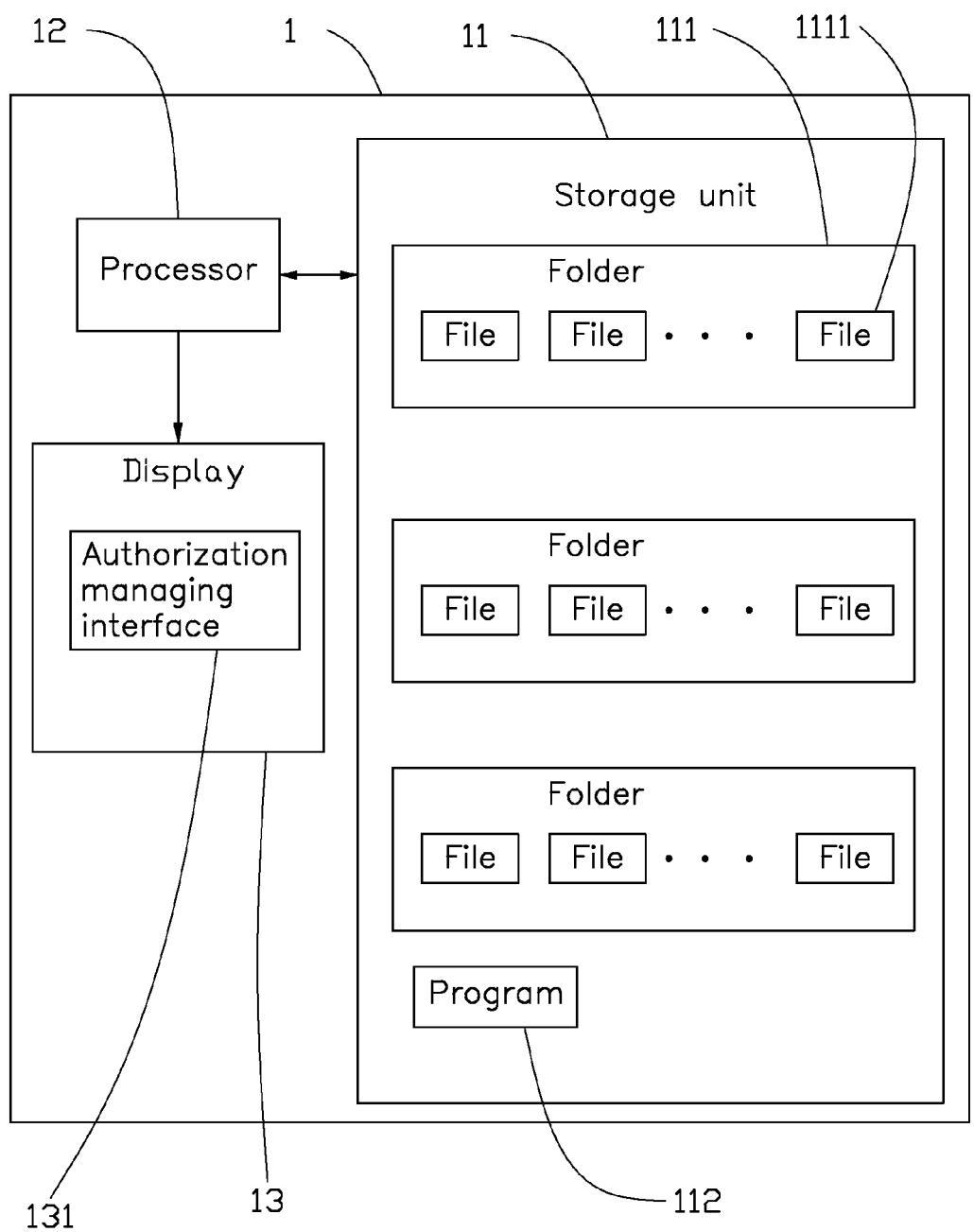
FIG. 1 is a block diagram of a portable electronic device according to an exemplary embodiment of the present disclosure.

Referring to FIG. 1, a block diagram of a portable electronic device 1 of the present disclosure according to an exemplary embodiment is shown. The device 1 includes a storage unit 11, a processor 12 and a display 13. The storage unit 11 stores several folders 111 and one or more programs 112, wherein each folder 111 contains several files 1111, and the program 12 is to be executed by the processor 12. The display 13 displays an authorization managing interface 131 while the device 1 is in an unauthorized state. While the device 1 is in the unauthorized state, a predefined set of actions are prohibited, for example, one of the prohibited actions is to access the folders 111.

Figure 2:
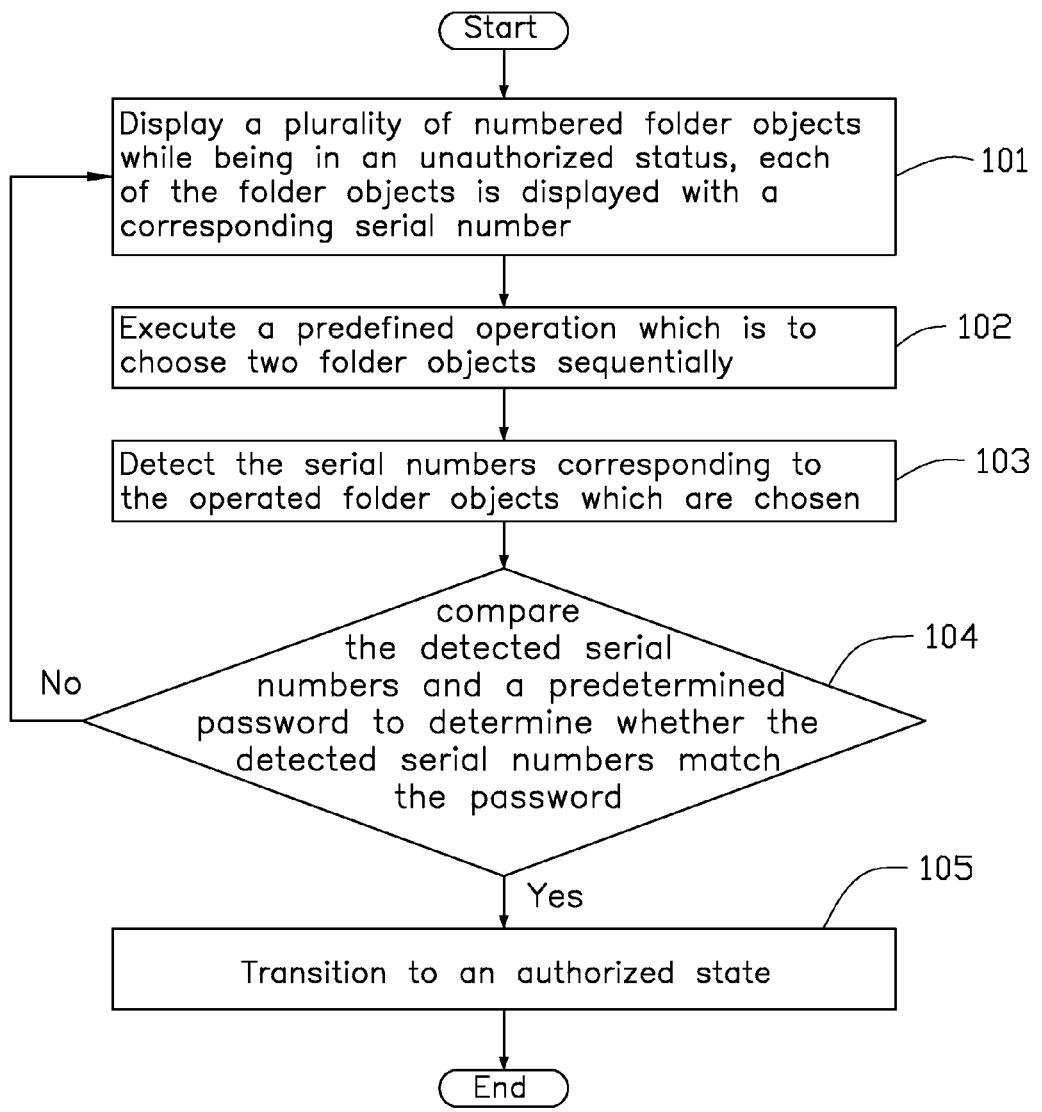
FIG. 2 is a flowchart illustrating the method for managing the authorization, according to a first embodiment of the present disclosure.
Figure 3:
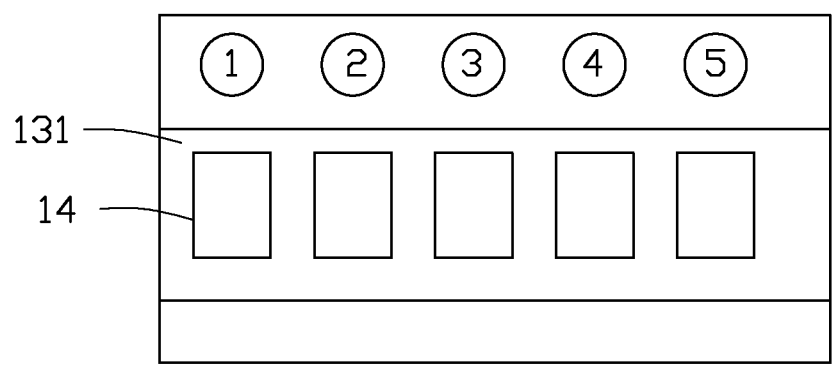
FIG. 3 is a schematic diagram illustrating an authorization managing interface according to a first embodiment of the present disclosure.

Referring to FIGS. 2 and 3, a flowchart illustrating the method of the present disclosure and a schematic diagram illustrating an authorization managing interface 131, both according to a first embodiment, are respectively shown. In the first embodiment of the present disclosure, the files 1111 contained in the folders 111 are images files, which preferably are photo files.

In step 101, while the device 1 is in the unauthorized state, display the authorization managing interface 131, which includes a plurality of numbered folder objects 14. As shown in FIG. 3, the folder objects 14 are graphical, interactive user-interface objects, while each of the folder objects 14 represents one of the folders 111 stored in the storage unit 11. Each folder object 14 is shown as an image implying a "photo album", which may be a representing photo on reduced scale (not shown in FIG. 3). Meanwhile, each of the folder objects 14 is displayed with a corresponding serial number.

In step 102, the device 1 executes a predefined operation from a user, to operate at least two of the folder objects 14. In the first embodiment of the present disclosure, the predefined operation is to choose at least two of the folder objects 14 sequentially, through a predefined choosing operation. After the choosing actions are finished, the serial numbers corresponding to chosen folder objects 14 are detected by the processor 12, in the chosen order, as step 103. For example, the user chooses the folder object 14 numbered "2" (corresponding to the serial number "2") at first, then chooses the folder object 14 numbered "5" (corresponding to the serial number "5") . As a result, the serial numbers "2" and "5" as two digits are sequentially detected by the processor 12.

In step 104, the device 1 compares the detected serial numbers and a predetermined password to determine whether the detected serial numbers correspond to the password. If the detected serial numbers do not correspond to the password, the device 1 maintains in the unauthorized state. If the detected serial numbers, "2" and "5", which will be combined by the processor 12 to be a sequence "25", correspond to the password which is also"25", the device 1 transits to an authorized state and above-mentioned predefined set of prohibited actions are not prohibited anymore, as step 105.

As a result, the user can authorize the device 1 in an unnoticeable way, without operating through a communicating window to input the password. Therefore, others may not know the authorization management is processing, and the embarrassment caused by is prevented.

Figure 4:
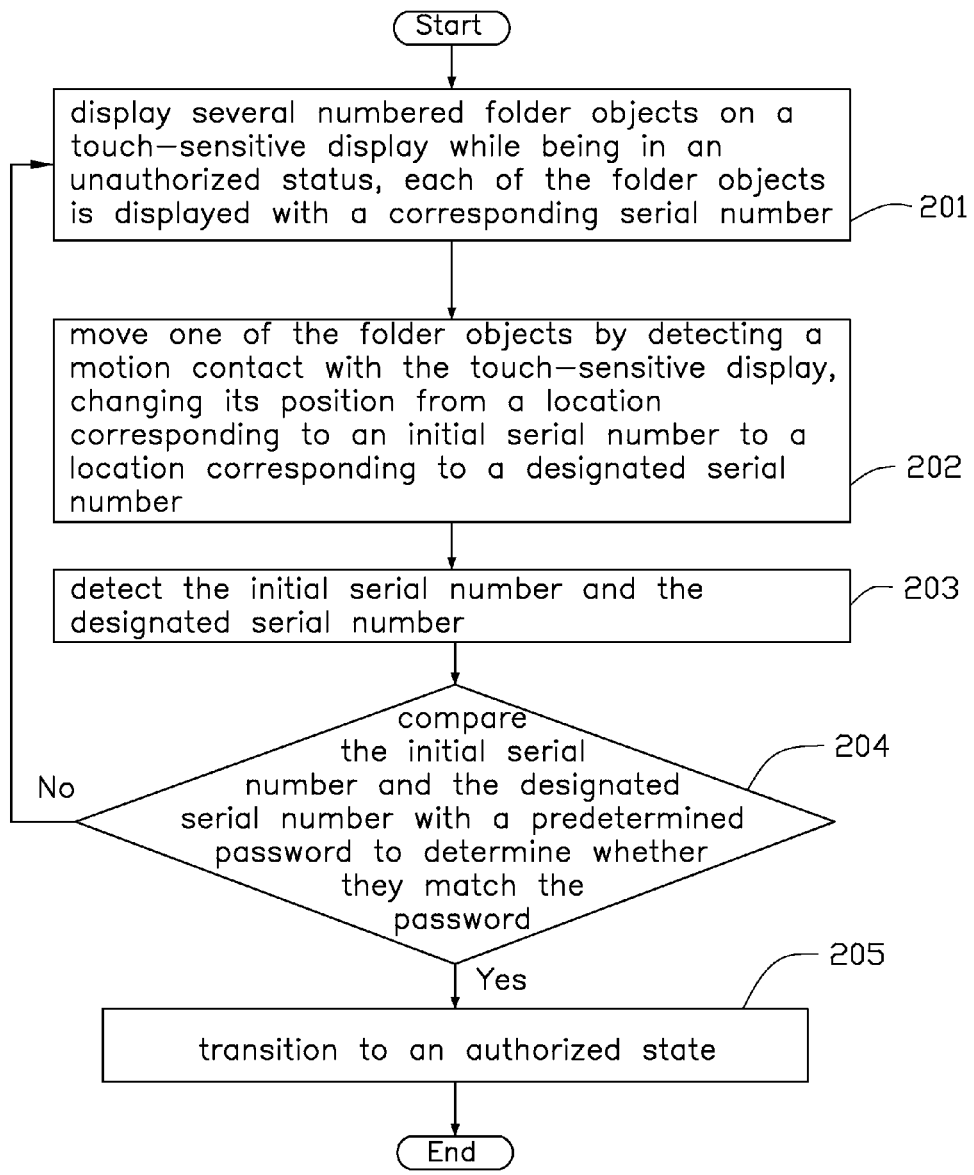
FIG. 4 is a flowchart illustrating the method for managing the authorization, according to a second embodiment of the present disclosure.
Figure 5A:
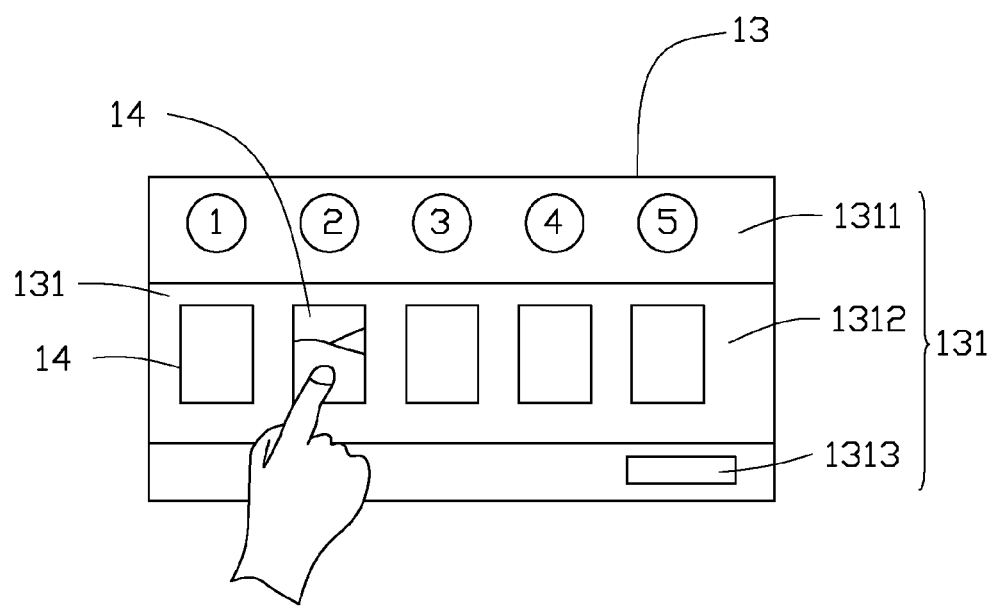
FIG. 5A is schematic diagrams illustrating an authorization managing interface according to a second embodiment of the present disclosure.
Figure 5B:
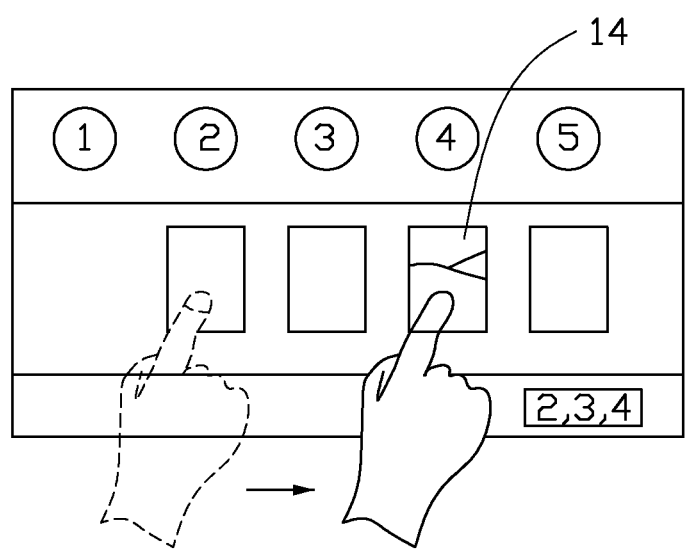
FIG. 5B is schematic diagrams illustrating an authorization managing interface according to a second embodiment of the present disclosure.

Referring to FIG. 4, a flowchart illustrating the method of the present disclosure according to a second embodiment is shown. Referring to FIGS. 5A and 5B, which are schematic diagrams illustrating an authorization managing interface according to the second embodiment. In the second embodiment, the display 13 of the device 1 is a touch-sensitive display, and the predetermined password is composed of several sequences, for example, 2-4, 5-8 and 10-11.

As shown in FIG. 5A, in step 201, while the device 1 is in the unauthorized status, the touch-sensitive display shows the authorization managing interface 131, which includes a serial numbers portion 1311, a sliding portion 1312 and an input portion 1313. The folder objects 14 are placed in the sliding portion 1312, and their corresponding serial numbers are placed in the serial numbers portion 1311, wherein each folder object 14 has a positional correlation with its corresponding serial number . The input portion 1313 is to show the digits represent the detected serial numbers.

In step 202, The user touches the touch-sensitive display by a finger to contact with a selected one of the folder objects 14. Then, as shown in FIG. 5B, the user drags the touching folder object 14 from its original location shown in FIG. 5A to a replacing location shown in FIG. 5B, through a continuous contact with the touch-sensitive display, as a predefined operation in the second embodiment. Thus, a position of the touching folder object 14 relative to an initial serial number, which is initially corresponding to the operated folder object 14, is changed. Meanwhile, the touching folder object 14 now has a positional correlation with a designated serial number.

In this embodiment, the initial serial number is "2" and the designated serial number is "4". Through the above-mentioned operation, the initial serial number and the designated serial number are detected by the processor 12, as step 203. Thus, a sequence beginning from the initial serial number and ending at the designated serial number, which is the sequence "2, 3, 4", is determined by the processor 12. Then, such sequence is compared with the predetermined password, as step 204. By repeating the above-mentioned operation, the user can "input" several sequences to the device 1 through means of detection and determining provided by the processor 12. The device 1 transits to an authorized state if the sequences all correspond to the password, as step 205. As a result, the user can authorize the device 1 in an unnoticeable way.

Moreover, the user can input the desired sequence to the device 1 through the predetermined operation described above in such two ways, to set the password while the device 1 is in a password-setting status and to lock the device 1 from the authorized status back to the unauthorized status. Without displaying a communicating window, the present disclosure can make the authorization management performed in the unnoticeable ways, therefore prevent the possible embarrassments might happen.

While the disclosure has been described in connection with what is considered the most practical and preferred embodiments, this disclosure is not to be limited to the disclosed embodiments but is intended to cover various arrangements included within the spirit and scope of the broadest interpretation so as to encompass all such modifications and equivalent arrangements.

What is claimed is:

1. A method for controlling an electronic device comprising a touch sensitive display, the method comprising:
    displaying a plurality of numbered folder objects while the device is in an unauthorized state, each of the folder objects is displayed with a corresponding serial number, wherein the folder objects are graphical, interactive user-interface objects respectively representing a folder containing a plurality of files stored in the device;
    receiving a continuous contact on the touch sensitive display that moves one of the plurality of numbered folder objects from a first position to a second position;
    determining serial numbers corresponding to the first position and the second position; and
    maintaining the device in the unauthorized state when the determined serial numbers do not correspond to a predetermined password, and changing the device from the unauthorized state to an authorized state when the determined serial numbers correspond to a predetermined password.

2. The method according to claim 1, while the device is in the unauthorized state, preventing the device from accessing the folders.

3. The method according to claim 1, wherein the predefined operation is to choose at least two of the folder objects sequentially, through which the serial numbers corresponding to the folder objects are detected sequentially.

4. A portable electronic device, comprising:
    a touch sensitive display;
    a storage unit that stores a plurality of folders, each of which contain a plurality of files;
    one or more processors; and
    one or more programs stored in the storage unit, executed by the processor for performing the following operations:
    displaying a plurality of numbered folder objects while the device is in an unauthorized state, each of the folder objects is displayed with a corresponding serial number, wherein the folder objects are graphical, interactive user-interface objects respectively representing one of the folders stored in the storage unit;
    receiving a continuous contact on the touch sensitive display that moves one of the plurality of numbered folder objects from a first position to a second position;
    determining serial numbers corresponding to the first position and the second position; and
    maintaining the device in the unauthorized state when the determined serial numbers do not correspond to a predefined password, and changing the device from the unauthorized state to an authorized state when the determined serial numbers correspond to a predetermined password.

5. The device according to claim 4, while the device is in the unauthorized state, preventing the device from accessing the folders.

6. The device according to claim 4, wherein the predefined operation is to choose at least two of the folder objects sequentially, through which the serial numbers corresponding to aforesaid folder objects are detected sequentially.

7. A method for controlling an electronic device comprising a touch sensitive display, the method comprising:
    displaying a plurality of numbered folder objects while the device is in an unauthorized state, each of the folder objects is displayed with a corresponding serial number, wherein the folder objects are graphical, interactive user-interface objects respectively representing a folder containing a plurality of files stored in the device;
    receiving a continuous contact on the touch sensitive display that moves one of the plurality of numbered folder objects from a first position to a second position;
    determining serial numbers corresponding to the first position, the second position, and various positions between the first position and the second position; and
    maintaining the device in the unauthorized state when the determined serial numbers do not correspond to a predetermined password, and changing the device from the unauthorized state to an authorized state when the determined serial numbers correspond to a predetermined password.

* * * * *